J. E. PERRAULT.
DEMOUNTABLE TIRE.
APPLICATION FILED JUNE 19, 1917.

1,264,969.

Patented May 7, 1918.
2 SHEETS—SHEET 2.

Inventor
Joseph E. Perrault
Atty's.

UNITED STATES PATENT OFFICE.

JOSEPH E. PERRAULT, OF BELMONT, MASSACHUSETTS.

DEMOUNTABLE TIRE.

1,264,969.

Specification of Letters Patent.

Patented May 7, 1918.

Application filed June 19, 1917. Serial No. 175,679.

*To all whom it may concern:*

Be it known that I, JOSEPH E. PERRAULT, a citizen of the United States, and resident of Belmont, Massachusetts, have invented certain new and useful Improvements in Demountable Tires, of which the following is a specification.

My present invention relates to a fastening device designed to removably or demountably secure to a wheel rim a cushion tire having a metal base or rim. The invention has among its objects to provide a fastening device which will be capable of use in connection with the standard makes of wheels and rims, which will be complete and self-contained and capable of being readily applied as a unit or ring, which will form a secure fastening for the tire and will yet permit the tire to be readily demounted for repair or replacement irrespective of the length of time the same has been in service.

With these and other objects in view the invention includes the novel features of construction and arrangement and combination of parts hereinafter described and particularly defined by the appended claims.

An embodiment of my invention is shown in the accompanying drawings, in which—

Figure 1:
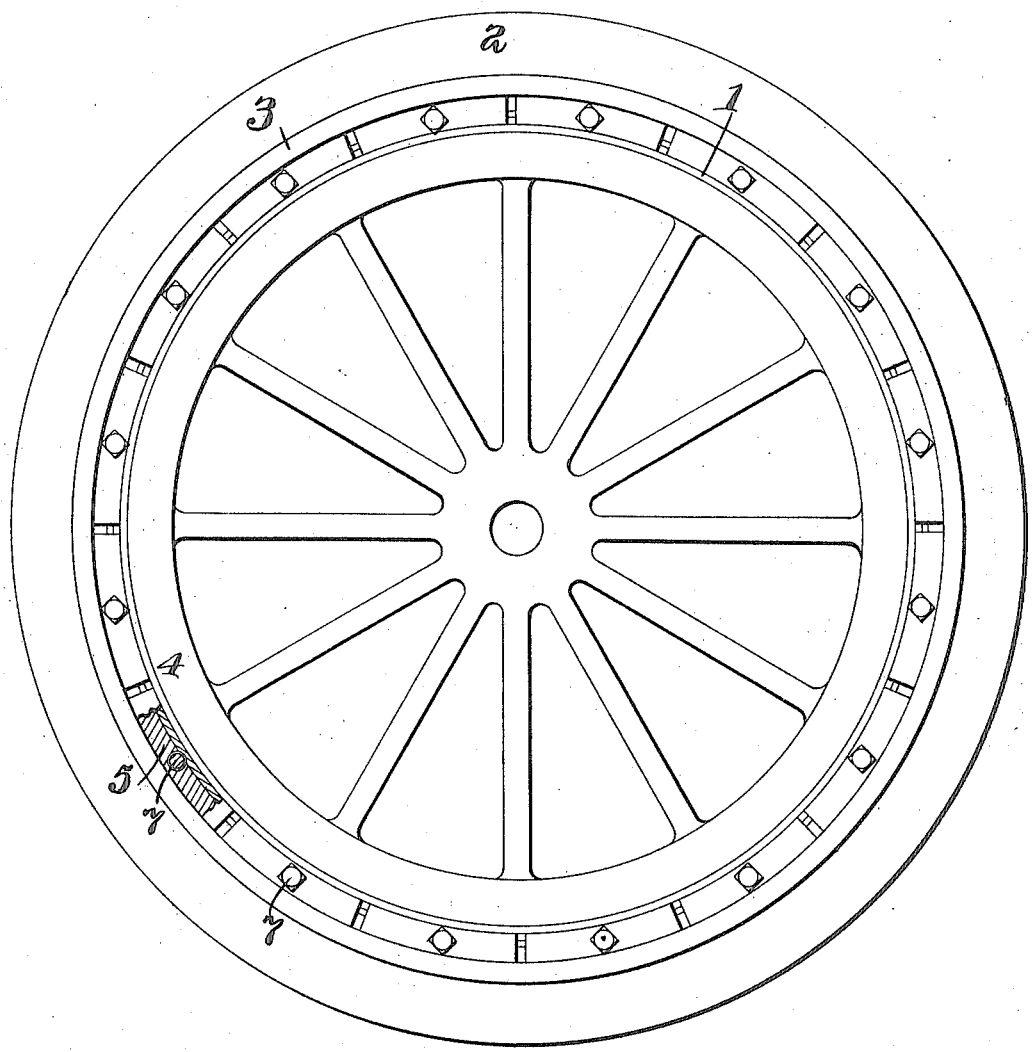
Figure 1 is a side elevation of a wheel partly broken away.
Figure 2:
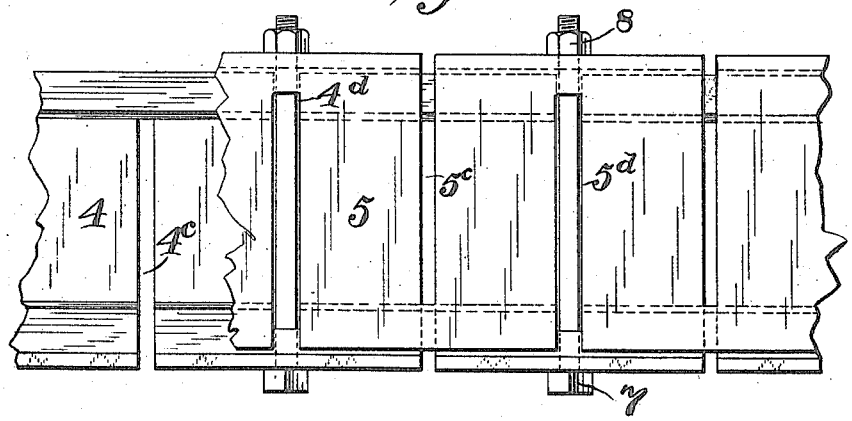
Fig. 2 is a plan view of a portion of the fastening device.
Figure 3:
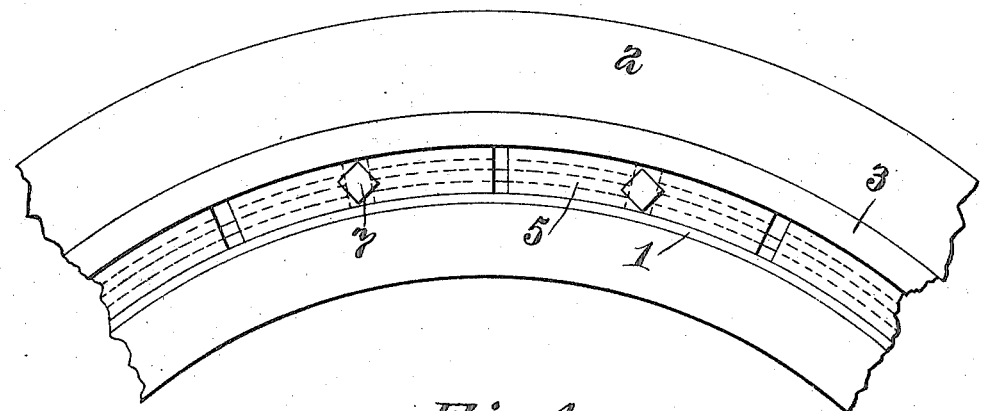
Fig. 3 is a side elevation of a portion of the wheel rim and tire on a larger scale illustrating the fastening device in place therebetween.
Figure 4:
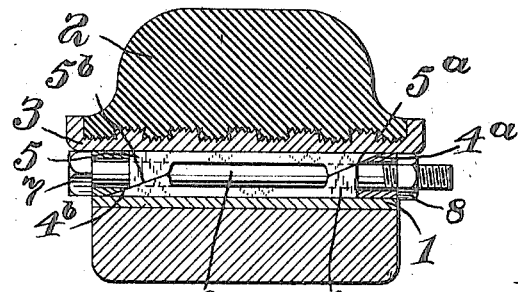
Fig. 4 is a section on line 4—4 of Fig. 3.

The standard wheels and cushion tires in general use comprise a wheel having a metal rim with a plain cylindrical outer periphery and a cushion tire vulcanized or otherwise securely fastened to a metal base having a smooth cylindrical inner surface adapted to be placed upon the rim of the wheel and secured thereon, usually by hydraulic pressure. The standard wheels and tires vary by two inches in diameter between successive sizes. It, therefore, follows that if in connection with a wheel of one size a tire of the next larger size is used, there will be left an annular space of approximately one inch across between the tire base and the wheel rim. My improved fastening device is designed to occupy this annular space and being complete and self-contained is capable of being readily inserted as a unit within this space and thereafter to be manipulated to secure the tire rim or base firmly to the rim by frictional contact which will hold it firmly against displacement.

Referring more particularly to these drawings, the numeral 1 designates the metallic rim of the ordinary wheel and which is representative of the periphery of a wheel of any desired form or construction. 2 designates the cushion tire which may also be of any desired form or construction and either solid or pneumatic, the same being carried by a metal base 3. Both the rim 1 and the base 3, as shown, have plain cylindrical surfaces.

My improved fastening device comprises a pair of cylindrical wedge rings 4 and 5 overlapping each other. The underlying ring 4 is provided with annular inclined surfaces $4^a$ and $4^b$ arranged respectively at different radial distances from the wheel axis, and the overlying ring 5 is provided with correspondingly inclined surfaces $5^a$ and $5^b$, each ring, therefore, having one thick and one thin edge disposed on relatively opposite sides of the wheel. The portions of the rings between these wedge surfaces are preferably rabbeted to leave an annular space, as indicated at 6. The rings are provided with equally spaced transversely disposed lining holes through which are passed headed bolts 7 provided on the opposite end with nuts 8, by the adjustment of which the rings may be drawn toward each other to secure the wedging action or released as desired. Ring 4 is provided with slots, or cuts $4^c$ extending from the thin edge over to a suitable distance from the opposite or thicker edge, and with intermediately located slits $4^d$ extending from the thicker edge over toward the thinner edge; it being only necessary to leave sufficient metal intact to insure the continuity of the ring and give it sufficient strength in assembling and disassembling. Similarly the outer ring 5 is provided with slots $5^c$ extending from the thicker edge toward the thinner, and intermediate or alternating slots $5^d$ extending from the thinner edge toward the thicker edge. I prefer to cause certain of these slots, as, for instance, $4^d$ and $5^d$, to coincide with the bolt openings and preferably make the outer slots $5^d$ of slightly greater width to accommodate the bolts and avoid the necessity of machining out the walls to permit the relative movement of the ring in relation to the bolts.

With the two fastening rings assembled as above described and held together by the bolts and in place between the tire base and the wheel rim, the tightening of the nuts on the bolts will force the rings in opposite directions. The alternate slits of the rings will permit the outer ring to be expanded against the interior of the tire base and the inner ring to be correspondingly contracted upon the wheel rim with the result that the rings will engage the tire base and wheel rim with great frictional contact and securely lock the tire upon the wheel.

I have found that I can use relatively sharp inclines for the wedge surfaces and this, while giving ample wedging action upon the screwing down of the nuts, will yet enable the rings to be readily separated, upon unscrewing the nuts, by a few taps, thus permitting the tire to be readily demounted for repairs or replacement.

While I have described bolts as the most convenient means for drawing the rings together, it will be understood that I do not limit myself in this respect.

Having thus described my invention what I claim is:—

1. In combination with a wheel rim and tire base, a pair of interposed overlapping wedge rings, each of said rings having slots extending inwardly from opposite edges and means for forcing said wedge rings in opposite directions.

2. In combination with a wheel rim and tire base, a self contained fastening device independent of said rim and tire base comprising a pair of interposed overlapping wedge rings, and bolts normally connecting said wedge rings and provided with means for forcing the rings in relatively opposite directions.

3. A self-contained fastening device independent of but adapted for use between a wheel rim and a removable tire base, comprising a pair of overlying continuous rings having reversely disposed coacting wedge surfaces and bolts passing transversely through said rings for forcing them in relatively opposite directions, each of said rings having slots extending alternately inwardly from opposite sides.

4. A self-contained fastening device independent of but adapted for use between a wheel rim and a removable tire base, comprising a pair of overlying continuous rings, each having a thick and a thin portion, the thick and thin portions of one ring having inclined faces coacting with correspondingly inclined faces on the thin and thick portions of the other ring and each of said rings having slots extending transversely from opposite edges and means extending transversely through the rings for forcing them in opposite directions.

In testimony whereof, I affix my signature.

JOSEPH E. PERRAULT.

Witnesses:
E. G. COLLINS,
D. T. HOOD.

Copies of this patent may be obtained for five cents each, by addressing the "Commissioner of Patents, Washington, D. C."